(12) United States Patent
Janson et al.

(10) Patent No.: US 10,082,196 B2
(45) Date of Patent: Sep. 25, 2018

(54) HYBRID TRANSAXLE

(71) Applicant: Ford Global Technologies, LLC, Dearborn, MI (US)

(72) Inventors: David Allen Janson, Plymouth, MI (US); Gregory Daniel Goleski, Rochester Hills, MI (US); David Gon Oh, Ann Arbor, MI (US); Jeffrey Edward Maurer, Commerce, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 176 days.

(21) Appl. No.: 15/254,395

(22) Filed: Sep. 1, 2016

(65) Prior Publication Data

US 2018/0058557 A1  Mar. 1, 2018

(51) Int. Cl.
| | |
|---|---|
| *F16H 3/72* | (2006.01) |
| *F16H 37/06* | (2006.01) |
| *F16H 37/08* | (2006.01) |
| *B60K 6/365* | (2007.10) |
| *B60K 6/50* | (2007.10) |

(52) U.S. Cl.
CPC ......... *F16H 37/0806* (2013.01); *B60K 6/365* (2013.01); *B60K 6/50* (2013.01); *F16H 37/0833* (2013.01); *B60Y 2200/92* (2013.01); *B60Y 2400/73* (2013.01); *B60Y 2400/80* (2013.01); *Y10S 903/911* (2013.01); *Y10S 903/915* (2013.01)

(58) Field of Classification Search
CPC .. F16H 37/08; F16H 37/0806; F16H 37/0833; B60K 6/365; B60K 6/50; B60Y 2400/73; B60Y 2400/80; B60Y 2200/92; Y10S 903/915; Y10S 903/911
See application file for complete search history.

(56) References Cited

U.S. PATENT DOCUMENTS

| | | | |
|---|---|---|---|
| 7,081,060 B2 | 7/2006 | Hata et al. | |
| 7,582,980 B2 | 9/2009 | Motoike et al. | |
| 8,142,317 B2 | 3/2012 | Nagamatsu | |
| 8,287,425 B2 | 10/2012 | Omote et al. | |
| 2007/0184932 A1* | 8/2007 | Tabata | F16H 3/663 475/275 |
| 2017/0240037 A1* | 8/2017 | Shibata et al. | B60K 6/365 |

* cited by examiner

*Primary Examiner* — Mark J Beauchaine
(74) *Attorney, Agent, or Firm* — David B. Kelley; Brooks Kushman P.C.

(57) ABSTRACT

A power split hybrid transaxle includes an axis transfer chain and a final drive planetary gear set. The components are arranged such that the power split planetary gear set is opposite the final drive planetary gear set with both located at the front of the transmission. This minimized the axial length of the transaxle by limiting the number of components that must be staggered axially. Furthermore, this permits use of electric machines with a large diameter and short axial length which also reduces the total axial length of the transaxle.

17 Claims, 3 Drawing Sheets

HYBRID TRANSAXLE

TECHNICAL FIELD

This disclosure relates to the field of vehicle transmissions. More particularly, the disclosure pertains to an arrangement of components in a hybrid transaxle.

BACKGROUND

Hybrid powertrains include energy storage devices such as batteries which are utilized to reduce fuel consumption by capturing braking energy and by permitting more efficient use of an internal combustion engine. The engine may be shut off while the vehicle is stationary. Also, the engine may be operated at higher power setting at which it is typically more efficient and then shut off a portion of the time that the vehicle is moving.

One type of hybrid powertrain is an electric power-split hybrid. At low speed, a planetary gear set divides the mechanical power generated by the internal combustion engine into two power flow paths. A portion of the power is conveyed to the drive wheels by gears, chains, or other mechanical power transfer components. The remaining power is directed to an electric machine and converted into electrical power. This electric machine is typically referred to as a generator although it may also be capable converting electrical power into mechanical power. A second electric machine drives the drive wheels. This second machine is typically referred to as a traction motor although it may be capable of converting mechanical power into electrical power. In some operating modes, all electrical power from the generator flows to the traction motor. In other operating modes, some electrical power may be diverted to a battery. In yet other operating modes, the battery may supplement the electrical power.

In a front wheel drive hybrid transaxle, the engine crankshaft rotates about an axis that is offset from and substantially parallel to an axle axis. The transaxle includes a differential on the axle axis which divides the power between left and right half-shafts that may rotate at slightly different speeds as the vehicle turns a corner. The space available for the transaxle is restricted by the size of the engine compartment and the space occupied by the engine.

SUMMARY OF THE DISCLOSURE

According to a first embodiment, a transaxle includes first and second planetary gear sets and first and second electric machines located along a common axis. A ring gear of the first planetary gear set is fixedly coupled to a first sprocket and to a carrier of the second planetary gear set and may also be fixedly coupled to a park gear. A ring gear of the second planetary gear set is fixedly held against rotation. The first electric machine is fixedly coupled to a sun gear of the first planetary gear set. The second electric machine is fixedly coupled to a sun gear of the second planetary gear set. A carrier of the first planetary gear set is fixedly connected to an input shaft which extends from a front side of the first planetary gear set. The second planetary gear set and the first and second electric machines are located on a rear side of the first planetary gear set. The second planetary gear sets and the electric machines may also be located on a rear side of the first sprocket. The transaxle may also include a pump having a pump shaft. A first chain may engage second and third sprockets. The second sprocket may be fixedly coupled to the input shaft and the third sprocket may be fixedly connected to the pump shaft. The transaxle may also include a differential having a differential input. A second chain may engage the first sprocket and a fourth sprocket which is driveably connected to the differential input. For example, the fourth sprocket may be driveably connected to the differential input via a third planetary gear set having a sun gear fixedly coupled to the fourth sprocket, a carrier fixedly coupled to the differential input, and a ring gear fixedly held against rotation.

According to a second embodiment, a transaxle includes a first planetary gear set, a second electric machine, a second planetary gear set, and a first electric machine located in that order along a common axis. The first and second electric machines are each fixedly connected to a ring gear of the respective planetary gear set. A first sprocket is fixedly coupled to a ring gear of the first planetary gear set. An input shaft may be fixedly coupled to a carrier of the first planetary gear set. The ring gear of the first planetary gear set may be fixedly coupled to a carrier of the second planetary gear set and may be fixedly coupled to a park gear. A ring gear of the second planetary gear set may be fixedly held against rotation. The transaxle may also include a pump having a pump shaft. A first chain may engage second and third sprockets. The second sprocket may be fixedly coupled to the input shaft and the third sprocket may be fixedly connected to the pump shaft. A second chain may engage the first sprocket and a fourth sprocket which is driveably connected to the differential input. For example, the fourth sprocket may be driveably connected to the differential input via a third planetary gear set having a sun gear fixedly coupled to the fourth sprocket, a carrier fixedly coupled to the differential input, and a ring gear fixedly held against rotation.

In a third embodiment, a hybrid transaxle includes a planetary gear set, firsth second, and third sprockets, a pump, and a first chain. A carrier of the planetary gear set is fixedly coupled to an input shaft and to the second sprocket. A ring gear of the planetary gear set is fixedly coupled to the first sprocket and may be fixedly coupled to a park gear. The third sprocket is fixedly coupled to a pump shaft. A first chain engages the second and third sprockets. The hybrid transaxle may further include a first electric machine fixedly coupled to the sun gear and a second electric machine driveably coupled to the ring gear. The input shaft may extend from a front side of the planetary gear set while the first and second electric machines are axially located on a rear side of the planetary gear set. The transaxle may further include a differential having an input driveably connected to a fourth sprocket and a second chain engaging the first and fourth sprockets.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotation speeds to be proportional with a predetermined speed ratio. If the power flow path is established in all operating conditions, then the components are fixedly driveably connected. If the power flow path is established only when one or more shift elements are engaged, then the components are selectively driveably connected.

Figure 1:
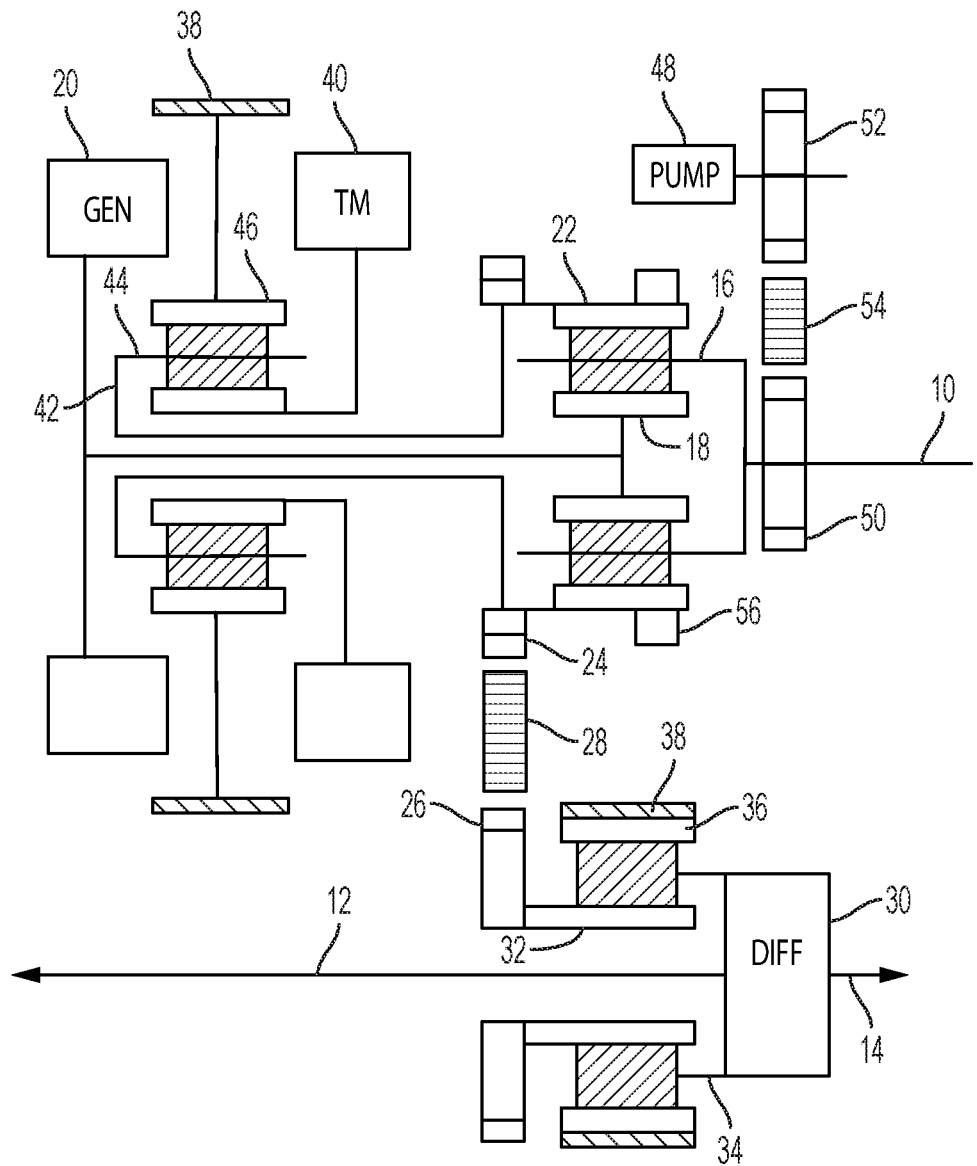
FIG. 1 is a schematic diagram of a first embodiment of a power-split hybrid transaxle.
Figure 2:
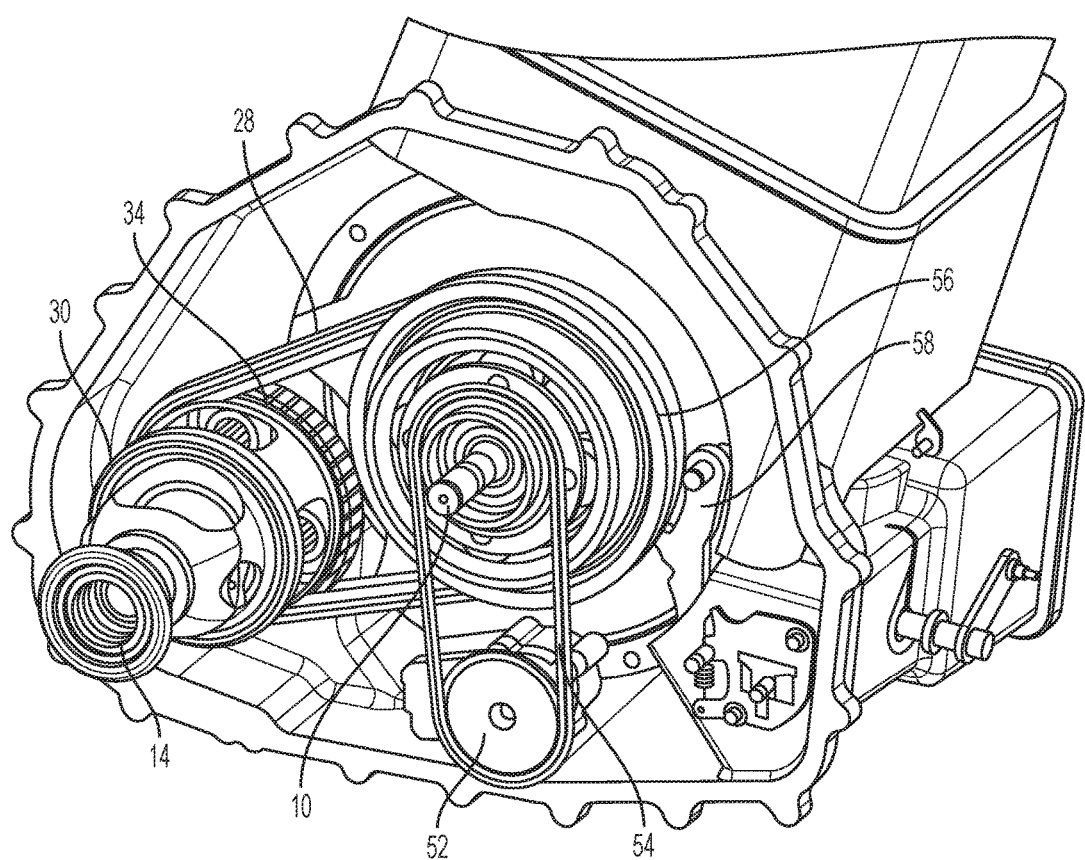
FIG. 2 is a pictorial view of the front end of the power-split hybrid transaxle of FIG. 1.

FIG. 1 is a schematic illustration of a hybrid transaxle. Power is received mechanically from an internal combustion engine via input shaft 10. Power is conveyed to left and right front vehicle wheels via half-shafts 12 and 14. Input shaft 10 is fixedly connected to the carrier 16 of the power split planetary gear set, which is axially located near the front of the transaxle. The sun gear 18 of the power split planetary gear set is fixedly coupled to generator 20, which is located at the back of the transaxle. The ring gear 22 of the power split planetary gear set is fixedly coupled to a first sprocket 24. A second sprocket 26 is supported for rotation about the differential axis and is fixedly driveably connected to the first sprocket 24 by a chain 28. The second sprocket 26 is driveably connected to a differential 30 by a final drive planetary gear set. The sun gear 32 of the final drive planetary gear set is fixedly coupled to second sprocket 26. The carrier 34 of the final drive planetary gear set is fixedly coupled to the input of differential 30. The ring gear 36 of the final drive planetary gear set is fixedly coupled to the transmission housing 38.

Traction motor 40 is fixedly driveably connected to first sprocket 24 via a torque multiplication planetary gear set. The sun gear 42 of the torque multiplication planetary gear set is fixedly coupled to traction motor 40. The carrier 44 of the torque multiplication planetary gear set is fixedly coupled to the first sprocket 24. The ring gear 46 of the torque multiplication planetary gear set is fixedly coupled to the transmission housing 38.

Placing sprocket 24 and the power split planetary gear set near the front of the transmission (near the engine) provides several advantages. First, there are no components on the differential axis opposite generator 20 and traction motor 40. This permits use of large diameter electric machines. For a given torque and power capacity, a larger diameter electrical machine tends to have a shorter axial length. Minimizing the axial length of the electrical machines minimized the overall axial length of the transaxle. Second, the power split planetary gear set and the final drive planetary gear set can be opposite one another, such that only the wider of the two impacts the total axial length of the transaxle.

Pump 48 distributes lubrication fluid to gears and bearings. A third sprocket 50 is fixedly coupled to input shaft 10 while a fourth sprocket 52 is fixedly coupled to the shaft of pump 48. Chain or belt 54 fixedly driveably connects the third and fourth sprockets. Whenever the engine is running, pump 48 draws fluid from a sump and distributes it to gears and bearings. Some of the fluid may also be diverted into an elevated reservoir such that fluid from the reservoir can provide lubrication when the engine is not running. Park gear 56 is fixedly coupled to ring gear 22.

Figure 3:
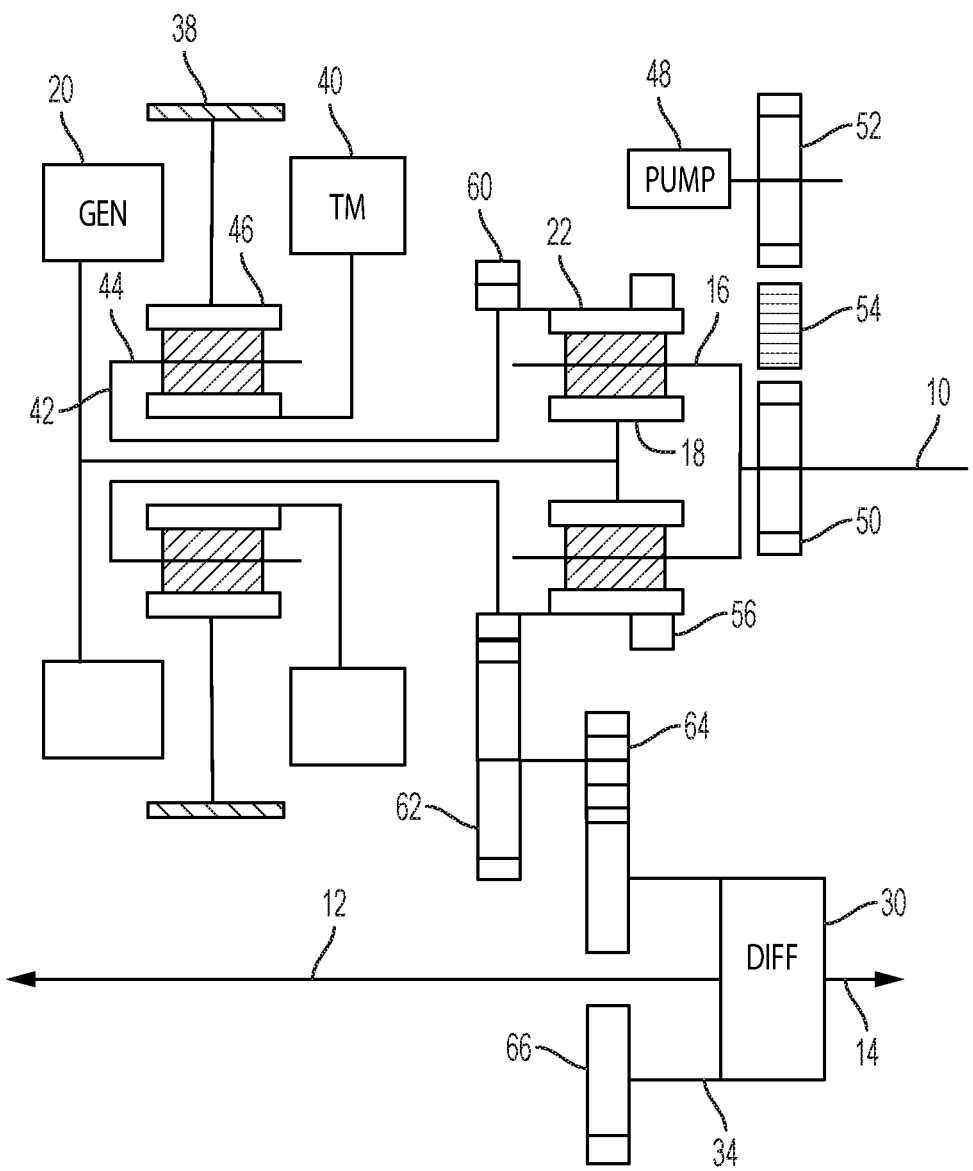
FIG. 3 is a schematic diagram of a second embodiment of a power-split hybrid transaxle.

FIG. 3 is a schematic illustration of an alternative embodiment having a geared final drive. Gear 60 is fixedly coupled to ring gear 22 in a similar manner to sprocket 24 of FIG. 1. Gear 60 meshes with gear 62, which is supported for rotation about an intermediate axis offset from both the crankshaft axis and the differential axis. Gear 62 is fixedly coupled to gear 64. Gear 64 meshes with gear 66 which is fixedly coupled to the input 34 of differential 30.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transaxle comprising:
   a first planetary gear set having a first sun gear, a first carrier fixedly coupled to an input shaft, and a first ring gear fixedly coupled to a first sprocket;
   a second planetary gear set having a second sun gear, a second carrier fixedly coupled to the first ring gear, and a second ring gear fixedly held against rotation relative to a transmission case;
   a first electric machine fixedly coupled to the first sun gear; and
   a second electric machine fixedly coupled to the second sun gear,
   wherein the first and second planetary gear sets and the first and second electric machines are all located along a common axis, the input shaft extends from a front side of the first planetary gear set, and the second planetary gear set and first and second electric machines are located on a rear side of the first planetary gear set.

2. The transaxle of claim 1 further comprising:
a pump having a pump shaft;
a second sprocket fixedly coupled to the input shaft;
a third sprocket fixedly coupled to the pump shaft; and
a first chain engaging the second sprocket and the third sprocket.

3. The transaxle of claim 1 further comprising:
a differential having a differential input;
a fourth sprocket fixedly driveably connected to the differential input; and
a second chain engaging the first sprocket and the fourth sprocket.

4. The transaxle of claim 3 wherein the fourth sprocket is fixedly driveably connected to the differential by a third planetary gear set having a sun gear fixedly coupled to the fourth sprocket, a carrier fixedly coupled to the differential input, and a ring gear fixedly held against rotation relative to the transmission case.

5. The transaxle of claim 1 wherein the second planetary gear set and first and second electric machines are located on a rear side of the first sprocket.

6. The transaxle of claim 1 further comprising a park gear fixedly coupled to the first ring gear.

7. A transaxle comprising:
a first planetary gear set, a second electric machine, a second planetary gear set, and a first electric machine located in that order along a common axis, wherein the first and second electric machines are each fixedly coupled to a sun gear of the respective planetary gear set; and
a first sprocket fixedly coupled to a ring gear of the first planetary gear set.

8. The transaxle of claim 7 further comprising an input shaft fixedly coupled to a carrier of the first planetary gear set.

9. The transaxle of claim 8 further comprising:
a pump having a pump shaft;
a second sprocket fixedly coupled to the input shaft;
a third sprocket fixedly coupled to the pump shaft; and
a first chain engaging the second sprocket and the third sprocket.

10. The transaxle of claim 8 wherein the ring gear of the first planetary gear set is fixedly coupled to a carrier of the second planetary gear set and a ring gear of the second planetary gear set is fixedly held against rotation relative to a transmission case.

11. The transaxle of claim 10 further comprising:
a differential having a differential input;
a fourth sprocket fixedly driveably connected to the differential input; and
a second chain engaging the first sprocket and the fourth sprocket.

12. The transaxle of claim 11 wherein the fourth sprocket is fixedly driveably connected to the differential by a third planetary gear set having a sun gear fixedly coupled to the fourth sprocket, a carrier fixedly coupled to the differential input, and a ring gear fixedly held against rotation relative to the transmission case.

13. The transaxle of claim 7 further comprising a park gear fixedly coupled to the ring gear of the first planetary gear set.

14. A hybrid transaxle comprising:
a planetary gear set having a sun gear, a carrier fixedly coupled to an input shaft, and a ring gear;
a first sprocket fixedly coupled to the ring gear;
a pump having a pump shaft;
a second sprocket fixedly coupled to the input shaft;
a third sprocket fixedly coupled to the pump shaft; and
a first chain engaging the second sprocket and the third sprocket;
a first electric machine fixedly coupled to the sun gear; and
a second electric machine fixedly driveably connected to the ring gear.

15. The hybrid transaxle of claim 14 wherein the input shaft extends from a front side of the planetary gear set and the first and second electric machines are axially located on a rear side of the planetary gear set.

16. The hybrid transaxle of claim 15 further comprising:
a differential having a differential input;
a fourth sprocket fixedly driveably connected to the differential input; and
a second chain engaging the first sprocket and the fourth sprocket.

17. The hybrid transaxle of claim 14 further comprising a park gear fixedly coupled to the ring gear.

\* \* \* \* \*